(12) United States Patent
Haag

(10) Patent No.: US 8,430,632 B2
(45) Date of Patent: Apr. 30, 2013

(54) SYSTEM AND METHOD FOR PITCHING A ROTOR BLADE IN A WIND TURBINE

(75) Inventor: Christian Haag, Karlstad (SE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/334,813

(22) Filed: Dec. 22, 2011

(65) Prior Publication Data
US 2012/0093645 A1 Apr. 19, 2012

(51) Int. Cl.
*F03D 7/00* (2006.01)
(52) U.S. Cl.
USPC ........ 416/1; 416/30; 416/35; 416/41; 416/46; 416/153; 415/1; 415/4.1; 415/4.4
(58) Field of Classification Search ............... 416/1, 30, 416/35, 41, 46, 47, 153; 415/1, 4.1, 4.4; 290/44, 55
See application file for complete search history.

(56) References Cited

U.S. PATENT DOCUMENTS

| | | | | |
|---|---|---|---|---|
| 4,160,170 A * | 7/1979 | Harner et al. | | 416/37 |
| 4,490,093 A * | 12/1984 | Chertok et al. | | 416/26 |
| 4,503,673 A * | 3/1985 | Schachle et al. | | 416/41 |
| 5,945,665 A | 8/1999 | Hay | | |
| 8,174,136 B2 * | 5/2012 | Johnson et al. | | 290/44 |
| 2009/0116962 A1 | 5/2009 | Pedersen et al. | | |
| 2009/0129925 A1 | 5/2009 | Vronsky et al. | | |
| 2009/0246019 A1 | 10/2009 | Volanthen et al. | | |
| 2010/0004878 A1 | 1/2010 | Volanthen et al. | | |
| 2010/0052320 A1 | 3/2010 | Hoffmann | | |
| 2010/0133814 A1 | 6/2010 | Schulten | | |
| 2010/0232963 A1 | 9/2010 | Volanthen et al. | | |
| 2011/0193343 A1 * | 8/2011 | Nakashima et al. | | 416/147 |

FOREIGN PATENT DOCUMENTS

| | | |
|---|---|---|
| GB | 2464961 | 5/2010 |
| WO | WO 2010061290 | 6/2010 |
| WO | WO 2010139613 | 12/2010 |

* cited by examiner

*Primary Examiner* — Igor Kershteyn
(74) *Attorney, Agent, or Firm* — Dority & Manning PA

(57) ABSTRACT

A system and method for pitching a rotor blade in a wind turbine are disclosed. The method includes collecting in an individual pitch controller for the rotor blade a pitch offset angle relative to a collective pitch angle. The method further includes determining a synchronized pitch offset angle. The method further includes, after an emergency condition occurs, pitching the rotor blade towards the synchronized pitch offset angle.

17 Claims, 4 Drawing Sheets

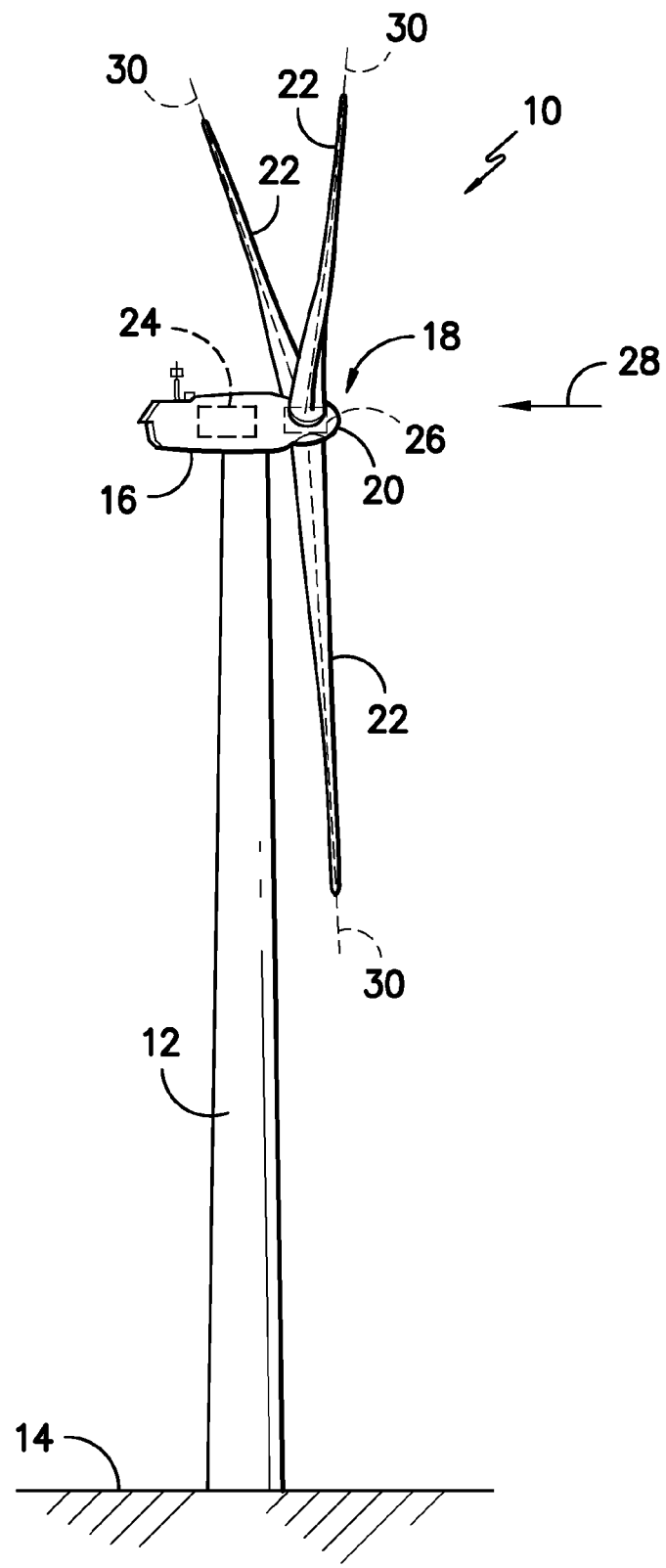
FIG. -1-

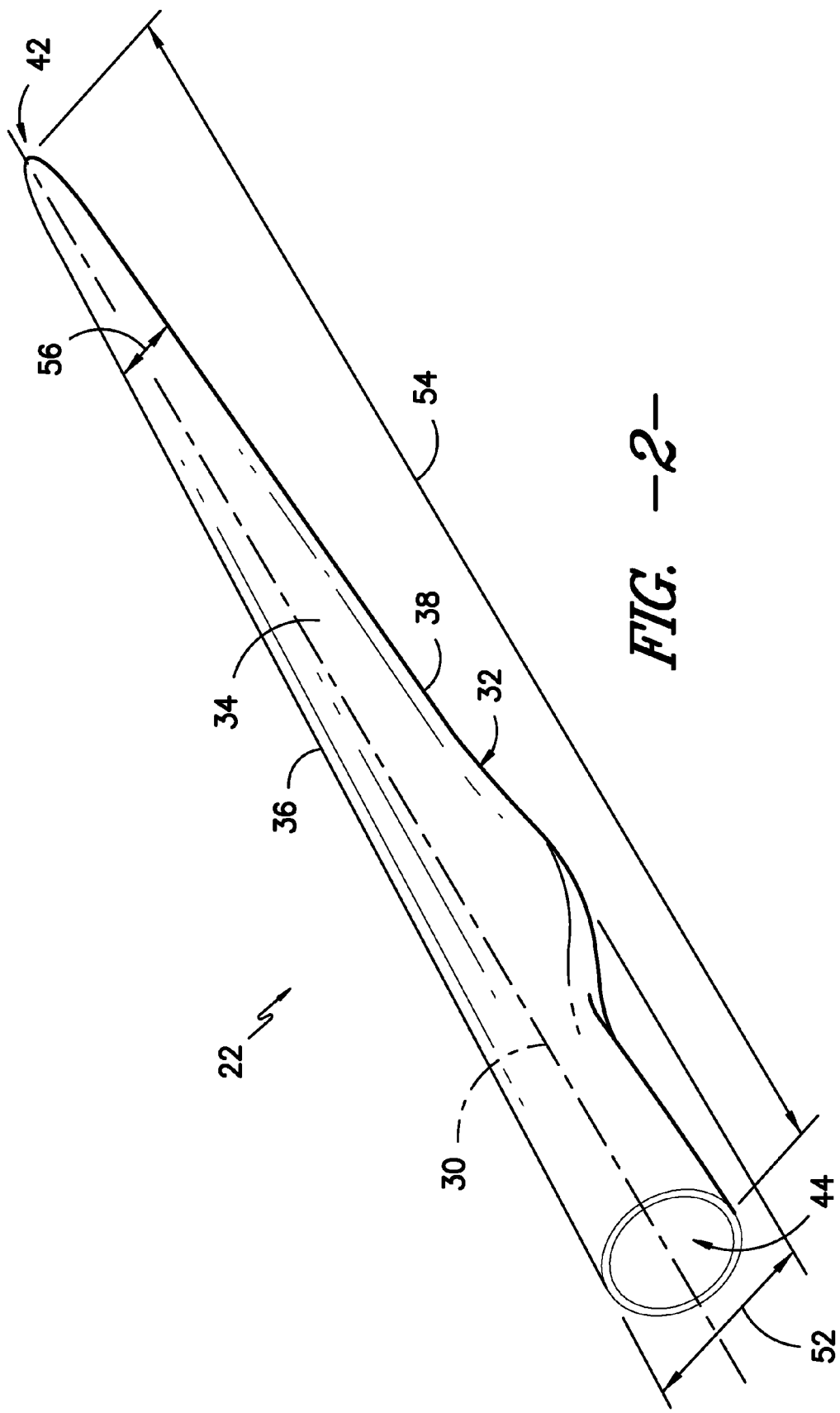
FIG. -2-

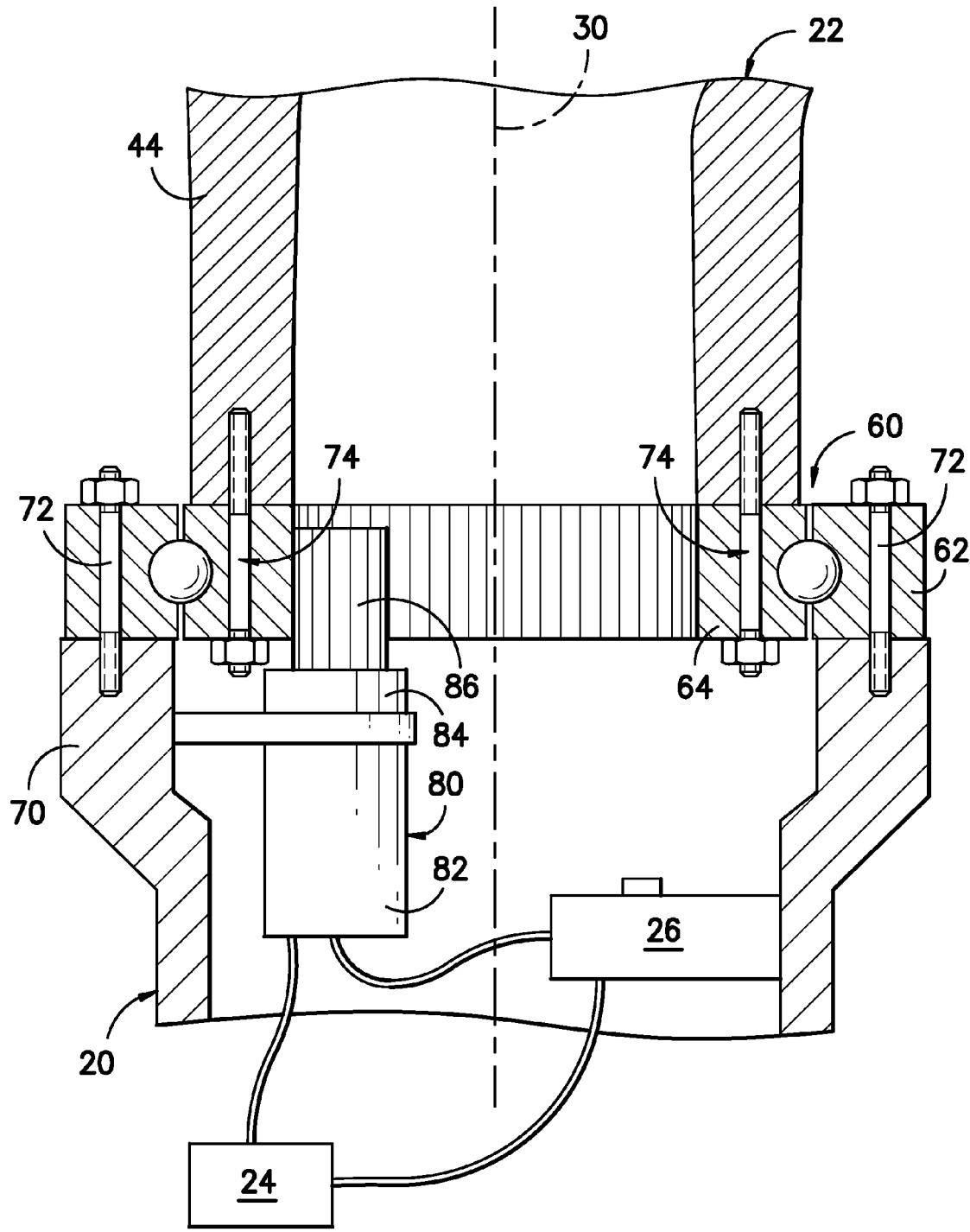
FIG. -3-

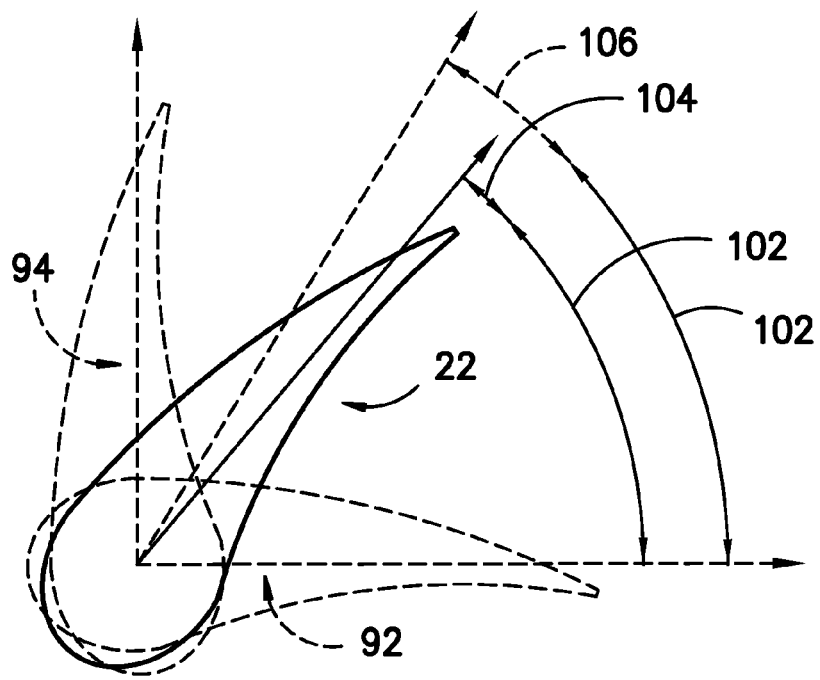
FIG. —4—
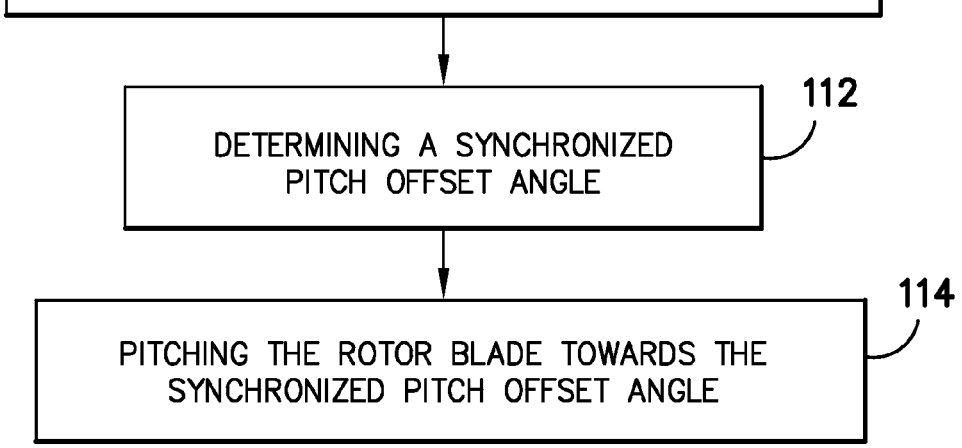
FIG. —5—

SYSTEM AND METHOD FOR PITCHING A ROTOR BLADE IN A WIND TURBINE

FIELD OF THE INVENTION

The present subject matter relates generally to wind turbines and, more particularly, to systems and methods for pitching rotor blades in wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, each rotor blade is subject to deflection and/or twisting due to the aerodynamic wind loads acting on the blade, which results in reaction loads transmitted through the blade. To control these loads and allow for maximum loading of the rotor blades to capture a maximum amount of wind energy without overloading and potentially damaging the rotor blades and other wind turbine components, the rotor blades may be pitched during operation. Pitching involves adjusting, such as rotating, a rotor blade about a pitch axis. Pitching of the rotor blade adjusts the loading that the rotor blade is subjected to during operation.

In many cases, each rotor blade of a wind turbine is pitched to an individual pitch angle, which may be different from the pitch angles of other rotor blades in the wind turbine. Further, these angles may be constantly or intermittently adjusted during operation. Such pitching operation for the rotor blades beneficially allows for frequent adjustment of the loading experienced by the rotor blades.

However, in emergency conditions, currently known pitching systems and methods may have various drawbacks. For example, in an emergency condition such as a power failure or communication breakdown, communication may be lost between a central controller for the wind turbine, which may control pitching of the rotor blades, and one or more individual rotor blades. Typically, in such an emergency condition, the rotor blades automatically, through various programming, follow a pitching profile to pitch to a feathered position. However, each rotor blade is programmed to follow the same profile, regardless of the individual pitch angle of the rotor blade when the emergency condition occurs. Thus, each rotor blade may follow the pitching profile without consideration of the pitch angle of the other rotor blades. This can lead to imbalances between the rotor blades when an emergency condition occurs, which can cause substantial damage to the rotor blades, the hub, the main shaft and/or various other components of the wind turbine.

Accordingly, an improved system and method for pitching a rotor blade in a wind turbine would be welcomed in the technology. For example, a system and method that reduce the risk of imbalances between rotor blades in the case of an emergency condition would be desired.

BRIEF DESCRIPTION OF THE INVENTION

Aspects and advantages of the invention will be set forth in part in the following description, or may be obvious from the description, or may be learned through practice of the invention.

In one embodiment, a method for pitching a rotor blade in a wind turbine is disclosed. The method includes collecting in an individual pitch controller for the rotor blade a pitch offset angle relative to a collective pitch angle. The method further includes determining a synchronized pitch offset angle. The method further includes, after an emergency condition occurs, pitching the rotor blade towards the synchronized pitch offset angle.

In another embodiment, a system for pitching a rotor blade in a wind turbine is disclosed. The system includes a hub, a rotor blade coupled to the hub, and a pitch adjustment mechanism configured to pitch the rotor blade to a pitch angle. The pitch angle includes a collective pitch angle and a pitch offset angle. The system further includes central controller in communication with the pitch adjustment mechanism, the central controller configured to cause the pitch adjustment mechanism to pitch the rotor blade. The method further includes an individual pitch controller in communication with the pitch adjustment mechanism and the central controller. The individual pitch controller is configured to collect the pitch offset angle and, after an emergency condition occurs, cause the pitch adjustment mechanism to pitch the rotor blade towards the synchronized pitch offset angle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment a rotor blade according to the present disclosure;

FIG. 3 illustrates a partial, cross-sectional view of one embodiment of a rotor blade coupled to a hub according to the present disclosure;

FIG. 4 illustrates a cross-sectional view of one embodiment of a rotor blade according to the present disclosure at various respective pitch angles; and, FIG. 5 is a flowchart illustrating one embodiment of a method according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22.

Additionally, the wind turbine 10 may include a central controller 24 centralized within the nacelle 16. However, it should be appreciated that the central controller 24 may be disposed at any location on or in the wind turbine 10, at any location on the support surface 14 or generally at any other location. The central controller 24 may generally be configured to control the various operating modes (e.g., start-up or shut-down sequences) and/or the components of the wind turbine 10. For example, the central controller 24 may be in communication with various components, including a pitch adjustment mechanism 80 as discussed below and an individual pitch controller 26 for each rotor blade 22, and may be configured to transmit suitable control signals thereto for controlling the blade pitch or pitch angle of the rotor blades 22 (i.e., an angle that determines a perspective of the blade 22 with respect to the direction 28 of the wind). The individual pitch controller 26 of each rotor blade 22 may additionally be in communication with various components, including a pitch adjustment mechanism 80 for the rotor blade 22 as discussed below and the central controller 24, and may be additionally configured to transmit suitable control signals thereto for controlling the blade pitch or pitch angle of the rotor blades 22. As is generally understood, the pitch angle may be adjusted about a pitch axis 30 of each rotor blade 22 in order to control the loads acting on the blades 22 (i.e., by adjusting an angular position the rotor blades 22 relative to the wind). Thus, in several embodiments, the central controller 24 and individual pitch controllers 26 may control the loads acting on the rotor blades 22 by transmitting suitable control signals to a pitch adjustment mechanism 80 (FIG. 3) of each rotor blade 22.

It should be appreciated that the central controller 24 and/or the individual pitch controllers 26 may generally comprise a computer or any other suitable processing unit. Thus, in several embodiments, the central controller 24 and/or the individual pitch controllers 26 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the central controller 24 and/or the individual pitch controllers 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the central controller 24 and/or the individual pitch controllers 26 to perform various functions including, but not limited to, storing, processing and/or analyzing signals transmitted from sensors, transmitting suitable control signals to the pitch adjustment mechanisms 80 (FIG. 3) and/or the like. In addition, the central controller 24 and/or the individual pitch controllers 26 may also include various input/output channels for receiving inputs from sensors and/or other measurement devices and for sending control signals to various components of the wind turbine 10.

Referring to FIG. 2, a rotor blade 22 according to the present disclosure may include exterior surfaces defining a pressure side 32, a suction side 34, a leading edge 36, and a trailing edge 38. The pressure side 32 and suction side 34 may each extend between the leading edge 36 and the trailing edge 38. The exterior surfaces may extend between a blade tip 42 and a blade root 44 in a generally span-wise direction, as discussed below.

One or more of the pressure side 32, suction side 34, the leading edge 36 and/or the trailing edge 38 may be generally aerodynamic surfaces having generally aerodynamic contours, as is generally known in the art. For example, the pressure side 32, suction side 34, the leading edge 36 and the trailing edge 38 as shown have generally aerodynamic surfaces having generally aerodynamic contours and thus forming an airfoil cross-sectional profile.

In some embodiments, the rotor blade 22 may include a plurality of individual blade segments aligned in an end-to-end order from the blade tip 42 to the blade root 44. Each of the individual blade segments may be uniquely configured so that the plurality of blade segments define a complete rotor blade 22 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 22. Alternatively, the rotor blade 22 may be formed as a singular, unitary blade having the designed aerodynamic profile, length, and other desired characteristics.

The rotor blade 22 may, in exemplary embodiments, be curved. Curving of the rotor blade 22 may entail bending the rotor blade 22 in a generally flapwise direction and/or in a generally edgewise direction. The flapwise direction may generally be construed as the direction (or the opposite direction) in which the aerodynamic lift acts on the rotor blade 22. The edgewise direction is generally perpendicular to the flapwise direction. Flapwise curvature of the rotor blade 16 is also known as pre-bend, while edgewise curvature is also known as sweep. Thus, a curved rotor blade 22 may be pre-bent and/or swept. Curving may enable the rotor blade 22 to better withstand flapwise and edgewise loads during operation of the wind turbine 10, and may further provide clearance for the rotor blade 22 from the tower 12 during operation of the wind turbine 10.

The rotor blade 22 may further define a chord 52 and a span 54 extending in chord-wise and span-wise directions, respectively. As shown, the chord 52 may vary throughout the span 54 of the rotor blade 22. Thus, as discussed below, a local chord 56 may be defined for the rotor blade 22 at any point on the rotor blade 22 along the span 54.

As shown in FIG. 3, a rotor blade 22 according to the present disclosure may be coupled to the hub 20 of the wind turbine 10. For example, in exemplary embodiments as shown, a rotor blade 22 may be coupled to the hub 20 of the wind turbine 10 through a pitch bearing 60. In general, the pitch bearing 60 may include an outer bearing race 62 and inner bearing race 64. The outer bearing race 62 may generally be configured to be mounted to a hub flange 70 of the hub 20 using a plurality of nut-bolt combinations 72 and/or other suitable mechanical fasteners. Similarly, the inner bearing race 64 may be configured to be mounted to the blade root 44 using a plurality of nut-bolt combinations 74. The pitch angle of each rotor blade 22 may be adjusted by rotating the inner bearing race 64 of the pitch bearing 60 relative to the outer bearing race 62. Pitching of each rotor blade 22 may thus occur in this fashion. It should be understood, however, that the present disclosure is not limited to a pitch bearing 60 coupling a rotor blade 22 to a hub 20. Rather, any suitable device or apparatus may be utilized to couple a rotor blade 22 to a hub 20, provided that such coupling device or apparatus may facilitate pitching of a rotor blade 22.

As shown in FIG. 3, pitching of a rotor blade 22 may be caused by a pitch adjustment mechanism 80. The pitch adjustment mechanism 80 may be configured to pitch the rotor blade 22 to a suitable pitch angle. For example, in embodiments wherein a pitch bearing 60 couples a rotor blade 22 to a hub 20, the relative rotation of the inner and outer bearing races 64, 62 may be achieved using a pitch adjustment mechanism 80 as shown.

In general, a pitch adjustment mechanism 80 may include any suitable components and may have any suitable configuration that allows the mechanism 32 to function as described herein. For example, as shown in the illustrated embodiment, the pitch adjustment mechanism 80 may include a pitch drive motor 82 (e.g., any suitable electric motor), a pitch drive gearbox 84, and a pitch drive pinion 86. In such an embodiment, the pitch drive motor 82 may be coupled to the pitch drive gearbox 84 so that the pitch drive motor 86 imparts mechanical force to the pitch drive gearbox 84. Similarly, the pitch drive gearbox 84 may be coupled to the pitch drive pinion 86 for rotation therewith. The pitch drive pinion 86 may, in turn, be in rotational engagement with the inner bearing race 64 (e.g., via a gear mesh) such that rotation of the pitch drive pinion 86 results in rotation of the inner bearing race 64 relative to the outer bearing race 62 and, thus, rotation of the rotor blade 22 relative to the hub 20.

As indicated above, operation of the pitch adjustment mechanism 32 for each rotor blade 22 may be controlled by the central controller 24 and the individual pitch controller 26 for that rotor blade 22. For example, as shown in FIG. 3, the central controller 24 and an individual pitch controller 26 may be in communication with the pitch adjustment mechanism 80 via a wired connection, such as by using a suitable communicative cable. In other embodiments, the central controller 24 and an individual pitch controller 26 may be in communication with the pitch adjustment mechanism 80 via a wireless connection, such as by using any suitable wireless communications protocol known in the art. Thus, the transmission of suitable signals from the central controller 24 and/or individual pitch controller 26 for a rotor blade 22 may cause the pitch adjustment mechanism 80 to adjust the pitch of the rotor blade 22.

As discussed, the pitch adjustment mechanism 80 may thus be configured to pitch the rotor blade 22 to a pitch angle. Such pitching may occur constantly or intermittently during operation of the wind turbine 10 and thus during the rotational cycle of a rotor blade 22. Thus, the central controller 24 and individual pitch controller 26 for a rotor blade 22 may be configured to cause the pitch adjustment mechanism 80 to pitch the rotor blade 22 on a constant or intermittent basis. The pitch angle of a rotor blade 22 may be determined relative to a fine position 92 and/or a feathered position for the rotor blade 22, as indicated in FIG. 4. The fine position 92 may be a position of maximum aerodynamic torque for the rotor blade 22. Thus, in the fine position 92, maximum loading of the rotor blade 22 may occur during operation of the wind turbine 10. The feathered position 94 may be a position of minimum or zero aerodynamic torque for the rotor blade 22. Thus, in the fine position 92, minimum or zero loading of the rotor blade 22 may occur during operation of the wind turbine 10. The fine position 92 may be considered to have a pitch angle of approximately 0 degrees, such as in the range between approximately 5 degrees and approximately −5 degrees, such as in the range between approximately 2 degrees and approximately −2 degrees. The feathered position 94 may be considered to have a pitch angle of approximately 90 degrees, such as in the range between approximately 85 degrees and approximately 95 degrees, such as in the range between approximately 88 degrees and approximately 92 degrees. The pitch angles for the fine position 92 and feathered position 94 may be defined with respect to each other and with respect to the wind direction 28.

A pitch angle according to the present disclosure may comprise, or consist of, a collective pitch angle 102 and a pitch offset angle 104. The collective pitch angle 102 may be determined by the central controller 24 for the wind turbine 10, and may be an angle to which each of the rotor blades 22 in the wind turbine 10 is adjusted. Thus, the collective pitch angle 102 for each rotor blade 22 in the wind turbine 10 may be generally identical. The central controller 24 may determine the collective pitch angle 102 for the rotor blades 22 based on any suitable number of variables, such as wind speed, desired output power, maximum loading capability, etc. The pitch offset angle 104 may be determined by the central controller 24 or the individual pitch controller 26 for each individual rotor blade 22, and may be an additional angle to which each of the rotor blades 22 in the wind turbine 10 is adjusted. The pitch offset angle 104 thus adds to or subtracts from the collective pitch angle 102, and the sum of the collective pitch angle 102 and the pitch offset angle 104 is the pitch angle for a rotor blade 22. The pitch offset angle 104 for each rotor blade 22 in the wind turbine 10 may be individualized for that rotor blade 22, and may be different from or generally identical to the pitch offset angle 104 for any other rotor blade 22 in the wind turbine 10. The central controller 24 or individual pitch controller 26 for an individual rotor blade 22 may determine the pitch offset angle 104 for that rotor blades 22 based on any suitable number of variables, such as wind speed, desired output power, maximum loading capability, etc.

The central controller 24 or the individual pitch controller 26 for each rotor blade 26 according to the present disclosure may further determine a synchronized pitch offset angle 106. The synchronized pitch offset angle 106 may be an angle to which each of the rotor blades 22 is adjusted in the event of an emergency condition. An emergency condition according to the present disclosure is a situation in which communication is lost or interrupted between one or more of the individual pitch controllers 26 and the central controller 24. Further, communication may be lost or interrupted between the central controller 24 and pitch adjustment mechanism 80. An emergency condition may occur in the event of, for example, a power outage, lightning strike, communication breakdown, etc. A loss of communication according to the present disclosure may be a generally permanent condition, such that the wind turbine 10 cannot be further operated normally until repairs are made. An interruption of communication may be a generally temporary condition, such that the wind turbine 10 may be operated normally after, for example, a period of time. For example, an interruption may last for 30 seconds, one minute, 5 minutes, 30 minutes, or for any suitable shorter or longer period of time. In the event of an emergency condition, because the central controller 24 can no longer communicate with the individual pitch controller 26 and/or pitch adjustment mechanism 80 of a rotor blade 22, and pitching of the rotor blade 22 can no longer be controlled by the central controller 24, the wind turbine 10 may be shut down. In order to prevent imbalance between the rotor blades 22 in the event of an emergency condition, each rotor blade 22 may thus pitch towards the synchronized pitch offset angle 106 if an emergency condition occurs. Such response of the rotor blades 22 according to the present disclosure may in some embodiments occur within a relatively short period of time, such as within 1 second, 2 seconds, 5 seconds, 10 seconds, 20 seconds, or 30 seconds, or may occur within any other suitable longer or shorter period of time.

The synchronized pitch offset angle 106 may be determined by the central controller 24 or the individual pitch controller 26 for each individual rotor blade 22, and may be an additional angle to which each of the rotor blades 22 in the wind turbine 10 is adjusted. The synchronized pitch offset angle 106 thus adds to or subtracts from the collective pitch angle 102, and the sum of the collective pitch angle 102 and the synchronized pitch offset angle 106 is the pitch angle for a rotor blade 22. The synchronized pitch offset angle 106 for each rotor blade 22 in the wind turbine 10 may be generally identical. The central controller 24 or individual pitch controller 26 for an individual rotor blade 22 may determine the synchronized pitch offset angle 106 for the rotor blades 22 based on any suitable number of variables, such as wind speed, desired output power, maximum loading capability, etc. Further, the central controller 24 or individual pitch controller 26 for an individual rotor blade 22 may determine the synchronized pitch offset angle 106 for the rotor blades 22 based on the individual pitch offset angles 104 for each of the rotor blades 22. For example, the synchronized pitch offset angle 106 may be adjusted constantly or intermittently as the various pitch offset angles 104 are adjusted during operation of the wind turbine 10, such that each rotor blade 22 can be pitched towards and/or to the synchronized pitch offset angle 106 with a predetermined period of time or within a predetermined rotational cycle for the rotor blade 22.

In some embodiments, the synchronized pitch offset angle 106 may be 0 degrees. In these embodiments, the pitch angle for a rotor blade 22 after the rotor blade 22 is pitched to the synchronized pitch offset angle 106 may be equal to the collective pitch angle 102. In other embodiments, the synchronized pitch offset angle 106 may be any suitable angle. In these embodiments, the pitch angle for a rotor blade 22 after the rotor blade 22 is pitched to the synchronized pitch offset angle 106 may be equal to the sum of the collective pitch angle 102 and synchronized pitch offset angle 106. Further, in some embodiments, the synchronized pitch offset angle 106 may be less than or equal to 10 degrees, less than or equal to 5 degrees, less than or equal to 2 degrees, or any other suitable range, subrange, or angle therein, from the pitch offset angle 104 for one or more of the rotor blades 22.

In some further embodiments, the synchronized pitch offset angle 106 may be determined based on the most recently determined, and collected as discussed below, pitch offset angle 104 for each rotor blade 22. Thus, in the event of an emergency condition, the synchronized pitch offset angle 106 that may be utilized for pitching the rotor blades 22 may be determined based on the final pitch offset angle 104 determined and collected for each rotor blade 22.

Each individual pitch controller 26 according to the present disclosure may collect the pitch offset angle 104 for the associated rotor blade 22, and may further collect the synchronized pitch offset angle 106 and/or the collective pitch angle 102. Thus, the pitch offset angle 104, synchronized pitch offset angle 106, and collective pitch angle 102 may be saved and accessible by the individual pitch controller 26 for each rotor blade 22 regardless of whether communication with the central controller 24 is available. As discussed, the pitch angle of each rotor blade 22, and thus the collective pitch angle 102, pitch offset angle 104, and synchronized pitch offset angle 106, may be adjusted constantly or intermittently during operation of the wind turbine 10. In exemplary embodiments, the pitch offset angle 104, the synchronized pitch offset angle 106, and/or the collective pitch angle 102, may be collected repeatedly, such as for example at a predetermined time interval, by an individual pitch controller 26.

As discussed above, the individual pitch controllers 26 according to the present disclosure may pitch the rotor blades 22 in the event of an emergency condition in a manner such that imbalances between rotor blades 22 are prevented. Thus, in the event of an emergency condition, when communication is lost between an individual pitch controller 26 and the central controller 24, the individual pitch controller 26 may determine whether the pitch offset angle 104 is different from the synchronized pitch offset angle 106. In the event that the pitch offset angle 104 is different from the synchronized pitch offset angle 106, the individual pitch controller 26 for a rotor blade 22 may cause the rotor blade 22 to pitch towards the synchronized pitch offset angle 106. Such pitching may in some embodiments occur for a predetermined time period, such as for less than or equal to 20 seconds, less than or equal to 10 seconds, less than or equal to 5 seconds, or any other suitable time period, range, or subrange of time periods. In other embodiments, such pitching may occur for a predetermined rotational cycle of the rotor blade 22, such as for less than or equal to one-half of a cycle, less than or equal to one-third of a cycle, less than or equal to one-fourth of a cycle, less than or equal to one-fifth of a cycle, or any portion of a cycle, range, or subrange of portions of a cycle. A rotational cycle is a full 360 degree rotation of a rotor blade 22. Additionally or alternatively, such pitching may occur until the rotor blade 22 reaches the synchronized pitch offset angle 106. The present disclosure thus allows each rotor blade 22 to, in the case of an emergency condition when communication with a central controller 24 is lost or interrupted, efficiently be pitched towards an approximately identical angle. As discussed above, because the individual pitch controller 26 for each rotor blade 22 collects the various angles, such as the pitch offset angle 104, synchronized pitch offset angle 106, and/or collective pitch angle 102, for each rotor blade 22, the rotor blades 22 may each be efficiently pitched towards such approximately identical synchronized pitch angle 106 despite a loss of communication with the central controller 24, and thus a loss of communication with each other. This efficient pitching in the case of an emergency condition may reduce or prevent imbalances between the rotor blades 22, because the rotor blades 22 will efficiently, such as in some embodiments within a predetermined period of time or predetermined rotational cycle, have approximately identical pitches.

In some embodiments, each of the plurality of rotor blades 22 may then be pitched towards the feathered position 94. Such pitching may occur after pitching towards the synchronized pitch offset angle 106. By first requiring pitching of each rotor blade towards the synchronized pitch offset angle 106, the present disclosure advantageously reduces or prevents imbalances between the rotor blades 22 during pitching towards the feathered position 94, because the rotor blades 22 will have approximately identical pitching profiles as they pitch towards the feathered position.

As shown in FIG. 5, the present disclosure is further directed to methods for pitching a rotor blade 22 or rotor blades 22 in a wind turbine 10. The method may include, for example, collecting in an individual pitch controller 24 for one or more of the rotor blades 22 a pitch offset angle 102 relative to a collective pitch angle 102, as shown in step 110 and described herein. The method further includes determining a synchronized pitch offset angle 104, as shown in step 112 and described herein. The method further includes pitching the rotor blade 22 towards the synchronized pitch angle 106, as shown in step 114 and described herein. The pitching step may occur after an emergency condition, such as after communication is lost or interrupted between an individual pitch controller 26 and the central controller 24 for the wind turbine 10. Further, the pitching step may occur only in the event that the pitch offset angle 104 is different from the synchronized pitch offset angle 106.

As discussed above, the collecting step may be performed repeatedly at a predetermined time interval. Thus, the relatively most recent pitch offset angle 104, as well as synchronized pitch offset angle 106 and collective pitch angle 102, may be collected. Further, as discussed above, the determining step and the pitching step may be performed based on the most recent pitch offset angle 104, as well as synchronized pitch offset angle 106 and collective pitch angle 102, collected before communication is lost between an individual pitch controller 26 and the central controller 24. These most recent angles are thus the final angles collected before the emergency condition occurred.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for pitching a rotor blade in a wind turbine, the method comprising:
    collecting in an individual pitch controller for the rotor blade a pitch offset angle relative to a collective pitch angle;
    determining a synchronized pitch offset angle; and
    after an emergency condition occurs, pitching the rotor blade towards the synchronized pitch offset angle;
    wherein the emergency condition is a loss of communication between the individual pitch controller and a central controller for the wind turbine.

2. The method of claim 1, wherein the rotor blade is pitched toward the synchronized pitch offset angle for a predetermined time period.

3. The method of claim 1, wherein the rotor blade is pitched toward the synchronized pitch offset angle for a predetermined rotational cycle of the rotor blade.

4. The method of claim 1, wherein the synchronized pitch offset angle is less than or equal to 10 degrees from the pitch offset angle.

5. The method of claim 1, wherein the synchronized pitch offset angle is 0 degrees.

6. The method of claim 1, wherein the collecting step is performed repeatedly at a predetermined time interval.

7. The method of claim 1, wherein the determining step and the pitching step are performed based on the final pitch offset angle collected before communication is lost.

8. The method of claim 1, further comprising pitching the rotor blade toward a feathered position.

9. A method for pitching a plurality of rotor blades in a wind turbine, the method comprising:
    collecting in an individual pitch controller for each of the plurality of rotor blades a pitch offset angle for that rotor blade relative to a collective pitch angle;
    determining a synchronized pitch offset angle for the plurality of rotor blades; and
    after an emergency condition occurs, if the pitch offset angle of that rotor blade is different from the synchronized pitch offset angle, pitching that rotor blade towards the synchronized pitch offset angle;
    wherein the determining step and the pitching step are performed based on the final pitch offset angle collected for the at least one of the plurality of rotor blades before communication is lost.

10. The method of claim 9, wherein the rotor blade is pitched toward the synchronized pitch offset angle for a predetermined time period.

11. The method of claim 9, wherein the rotor blade is pitched toward the synchronized pitch offset angle for a predetermined rotational cycle of the rotor blade.

12. The method of claim 9, wherein the synchronized pitch offset angle is less than or equal to 10 degrees from the pitch offset angle.

13. The method of claim 9, wherein the synchronized pitch offset angle is 0 degrees.

14. The method of claim 9, wherein the collecting step is performed repeatedly at a predetermined time interval for each of the plurality of rotor blades.

15. The method of claim 9, further comprising pitching each of the plurality of rotor blades toward a feathered position.

16. A system for pitching a rotor blade in a wind turbine, the system comprising:
    a hub;
    a rotor blade coupled to the hub;
    a pitch adjustment mechanism configured to pitch the rotor blade to a pitch angle, the pitch angle comprising a collective pitch angle and a pitch offset angle;
    a central controller in communication with the pitch adjustment mechanism, the central controller configured to cause the pitch adjustment mechanism to pitch the rotor blade; and,
    an individual pitch controller in communication with the pitch adjustment mechanism and the central controller, the individual pitch controller configured to collect the pitch offset angle and, after an emergency condition occurs, cause the pitch adjustment mechanism to pitch the rotor blade towards the synchronized pitch offset angle;
    wherein the emergency condition is a loss of communication between the individual pitch controller and a central controller for the wind turbine.

17. The system of claim 16, further comprising a pitch bearing connecting the rotor blade to the hub.

* * * * *